United States Patent [19]

Jansen et al.

[11] Patent Number: 5,376,349

[45] Date of Patent: Dec. 27, 1994

[54] METHOD OF PRODUCING TANTALUM (V) NITRIDE

[75] Inventors: Martin Jansen, Bonn; Hans-Peter Letschert, Ransbach-Baumbach; Dietrich Speer, Hanau, all of Germany

[73] Assignee: Degussa Aktiengesellschaft, Frankfurt am Main, Germany

[21] Appl. No.: 135,998

[22] Filed: Oct. 14, 1993

[30] Foreign Application Priority Data

Oct. 16, 1992 [DE] Germany ............... 4234938

[51] Int. Cl.$^5$ ............................................. C01B 21/06
[52] U.S. Cl. .................................... 423/409; 423/592
[58] Field of Search ............................................ 423/409

[56] References Cited

U.S. PATENT DOCUMENTS

| 2,461,020 | 2/1949 | Alexander | 423/409 |
| 4,975,260 | 12/1990 | Imai et al. | 423/409 |

FOREIGN PATENT DOCUMENTS 27828 of 1907 United Kingdom ............... 423/409

OTHER PUBLICATIONS

G. Brauer and J. R. Weidlein, "Synthesis and Properties of Red Tantalum Nitride $Ta_3N_5$", *Angew. Chem. Internat. Edit./*vol. 4 (1965), No. 3, pp. 241, 242.

H. Funk and H. Boehland "Zur Darstellung von Metallnitride aus Ammoniumfluoromethallaten und Ammoniak," *Z. Anorg. Allg. Chem. 334*, pp. 155–162 (1964).

Brauer and Weidlein, "Synthese und Eigenschaften des roten Tanatalnitrids $Ta_3N_5$", *Angew. Chem.*, 77, 218 (1965).

Moureu and Hamblet, *J. Amer. Chem. Soc.*, vol. 59, Jan. 1937, pp. 33–40.

*Primary Examiner*—Wayne Langel
*Attorney, Agent, or Firm*—Beveridge, DeGrandi, Weilacher & Young

[57] ABSTRACT

An improved method for producing tantalum (V) nitride by means of nitriding an oxidic tantalum (V) compound is described. The $Ta_3N_5$ product obtained in accordance with this method may be used as a red coloring pigment, particularly for coloring plastics and varnishes. An improved color intensity can be achieved and/or the reaction time can be shortened using the process in accordance with the invention. The process includes nitriding tantalum (V) hydrated oxide with the composition of the formula $Ta_2O_5 \cdot aq$ with a hydrate content (i.e., aq content) in a range of 14 to 17% by weight. The nitridation preferably takes place in the presence of a fluxing agent such as ammonium carbonate or boric acid.

14 Claims, 3 Drawing Sheets

METHOD OF PRODUCING TANTALUM (V) NITRIDE

BACKGROUND OF THE INVENTION

The invention relates to a method of producing tantalum (V) nitride by nitridation of an oxidic tantalum (V) compound. The invention further relates to the use of the tantalum (V) nitride obtained in accordance with the invention as a coloring pigment.

Coloring bodies, such as pigments, are subject to many adverse influences, depending on the type of application and the use of the articles colored with them. In the case of plastic articles colored with pigments based on oxidic, sulfidic or selenidic heavy-metal compounds, acidic or alkaline solutions of toxicologically hazardous components also can be released, e.g., Ni, Co, Zn and Cr from spinels and Cd from cadmium sulfide yellow, as well as Cd and Se from cadmium sulfoselenide red.

A further problem is the release of toxic heavy metals during combustion in garbage incinerating plants of discarded plastics colored in this manner. Therefore, there is a particular interest in finding pigments in the yellow to red spectral range which contain fewer hazardous components than, e.g., CdS yellow and Cd (S, Se) red.

The nitridation of tantalum (V) compounds with ammonia at high temperatures was investigated in various manners. During this process, red tantalum (V) nitride ($Ta_3N_5$) is formed via dark green, bright green, yellowish brown and reddish brown intermediate stages. However, applicants are not aware of any suggestions for the use of tantalum (V) nitride ($Ta_3N_5$) as a coloring pigment.

The nitride of pentavalent tantalum can be produced according to H. Moureau and C.H. Hamblet (J. Amer. Chem. Soc. 59, 33–40 (1937)) by means of ammonolysis of $TaCl_5$. This document is entirely incorporated herein by reference. The intermediate stage $Ta(NH_2)_2Cl_3$ in the process described therein is decomposed in an ammonia flow at 650° to 750° C. The nitride obtained by this process was not pure because it contained oxidic components. In addition, very long reaction times were required; e.g., 6 days at 750° C.

H. Funk and H. Bohland (Z. Anorg. Allg. Chem. 334, 155–62 (1964)) describe a process wherein the reaction times were shortened by using $(NH_4)_2TaF_6$ as the initial product. Due to the volatility of $TaF_5$ and $NH_4F$, the yields of $Ta_3N_5$ are low and/or the resulting products contain fluorine. This document also is entirely incorporated herein by reference.

The Funk and Bohland document also disclosed the nitridation of tantalum (V) oxide ($Ta_2O_5$) at 800° C. with ammonia. In this process, oxide-containing nitride ($Ta_3N_5(O)$) forms at 800° C., the color of which was not characterized in detail. The nitridation of pure tantalum pentoxide with purified ammonia was re-investigated by G. Brauer and J.R. Weidlein (Angew. Chem. 77, 218-9 (1965)) with reference made to the investigation of Funk and Bohland. The Brauer and Weidlein document also is entirely incorporated herein by reference. Brauer and Weidlein described that in the presence of titanium shavings as getter for oxygen and analogously for the decomposition of ammonia, the reaction requires a reaction time of 36 to 120 hours at 860° C. to 920° C. The reaction is completed only in the presence of the titanium shavings. However, while reworking the investigations of Brauer and Weidlein by the applicants, the reaction times were not able to be corroborated. The color formation was not terminated until after a reaction time of 150 hours, that is, no further color shift from reddish brown to red takes place.

SUMMARY OF THE INVENTION

The present invention relates to an essentially red coloring pigment which is absolutely safe toxicologically and is suitable for coloring plastics. A further aspect of the invention relates to providing an improved method for producing the coloring pigment. This invention, in contrast to the previously known method, seeks to provide a pigment with a greater color intensity at a given reaction time and/or to shorten the reaction time. It is a further objective of the invention to provide a method wherein the starting materials are readily accessible raw materials, and the resulting desirable pigments must be reliably reproducible.

The process in accordance with the invention includes a method of producing tantalum (V) nitride by means of the nitridation of an oxidic tantalum (V) compound with dry ammonia at 750° C. to 950° C. In this process, tantalum (V) hydrated oxide with a composition of the formula $Ta_2O_5 \cdot aq$ with a hydrate content (i.e., aq content) in a range of 14 to 17% by weight is used as the oxidic tantalum (V) compound.

Preferably, in the process in accordance with the invention the nitridation is carried out at 800° to 870° C.

Also in this process, it is preferable if the nitridation is carried out in the presence of a fluxing agent selected from the group consisting of: ammonium salts, carbonic acid, the lower monovalent carbonic acids and the polyvalent carbonic acids. Alternatively, in the process in accordance with the invention, the nitridation may be carried out in the presence of a fluxing agent selected from the group of: boric acids, boric acid anhydride, and ammonium salts of boric acids.

When a fluxing agent is used in the process in accordance with the invention, it is preferred if the tantalum (V) hydrated oxide and fluxing agent are used in a weight ratio of 1 to 0.01 up to 1 to 2, and preferably in a ratio of 1 to 0.1 up to 1 to 1.

As the starting materials, it is preferable if an intensively homogenized powder mixture of tantalum (V) hydrated oxide and flux is nitrided.

Another aspect of this invention relates to the use of the tantalum (V) nitride ($Ta_3N_5$) obtained according to the process of the invention as coloring pigment. The pigment may be incorporated into suitable materials, such as plastics and varnishes, by conventional methods known to those skilled in the art.

BRIEF DESCRIPTION OF THE DRAWINGS

The invention is described in more detail hereinbelow, particularly when considered in conjunction with the attached figures, wherein.

DETAILED DESCRIPTION OF THE INVENTION

The invention will be described in conjunction with various specific examples. These examples should be construed as illustrating the invention and not as limiting the same.

A method was found for the production of tantalum (V) nitride by means of the nitridation of an oxidic tantalum (V) compound with dry ammonia at 750° C. to 950° C. The process utilizes tantalum (V) hydrated oxide with the composition of the formula $Ta_2O_5 \cdot aq$, having a hydrate content (i.e., aq content) in a range of 14 to 17% by weight, as the oxidic tantalum (V) compound starting material.

The tantalum (V) nitride ($Ta_3N_5$) produced in accordance with the method of the invention can be used as a coloring pigment. It is especially suitable for the coloring of plastics and varnishes.

The nitridation takes place in principle according to the following reaction:

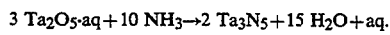

$$3\ Ta_2O_5 \cdot aq + 10\ NH_3 \rightarrow 2\ Ta_3N_5 + 15\ H_2O + aq.$$

The hydrate content (aq) of the tantalum (V) hydrated oxide corresponds to a tetrahydrate to pentahydrate. The hydrate content (aq) is determined gravimetrically by heating the tantalum (V) hydrated oxide dried at 120° C. to 1000° C. The specific structure exhibited by the tantalum (V) hydrated oxide to be used in the process in accordance with the invention is approximately one in accordance with the formula $Ta_2O_5 \cdot 5\ H_2O$ or $Ta(OH)_5$. This structure was not known in the past. It is essential for the invention that the tantalum (V) hydrated oxide dried at 120° C. exhibits a residual water content of 14 to 17% by weight, especially 16 to 17% by weight.

One skilled in the art would not have foreseen that tantalum (V) nitride may be produced in greater purity thereby resulting in a product with a higher color intensity by means of using the tantalum (V) hydrated oxides such as that produced in the product in accordance with the invention, as opposed to using the previously known tantalum (V) oxide ($Ta_2O_5$).

The tantalum (V) hydrated oxide, which is used with preference according to the invention, may be produced using the following steps: (a) dissolving tantalum pentachloride in concentrated hydrochloric acid in a boiling heat; (b) diluting the solution with water and adding aqueous ammonia up to approximately pH 7; (c) filtering off the precipitate, if necessary, after having previously treated the suspension in boiling heat; (d) washing the precipitate with water until it is free of chloride, and finally washing with ethanol; and (e) drying at 120° C. The product produced in this manner is X-ray amorphous and exhibits a residual water content in a range of approximately 14–17%, and preferably 16–17% by weight.

Figure 1:
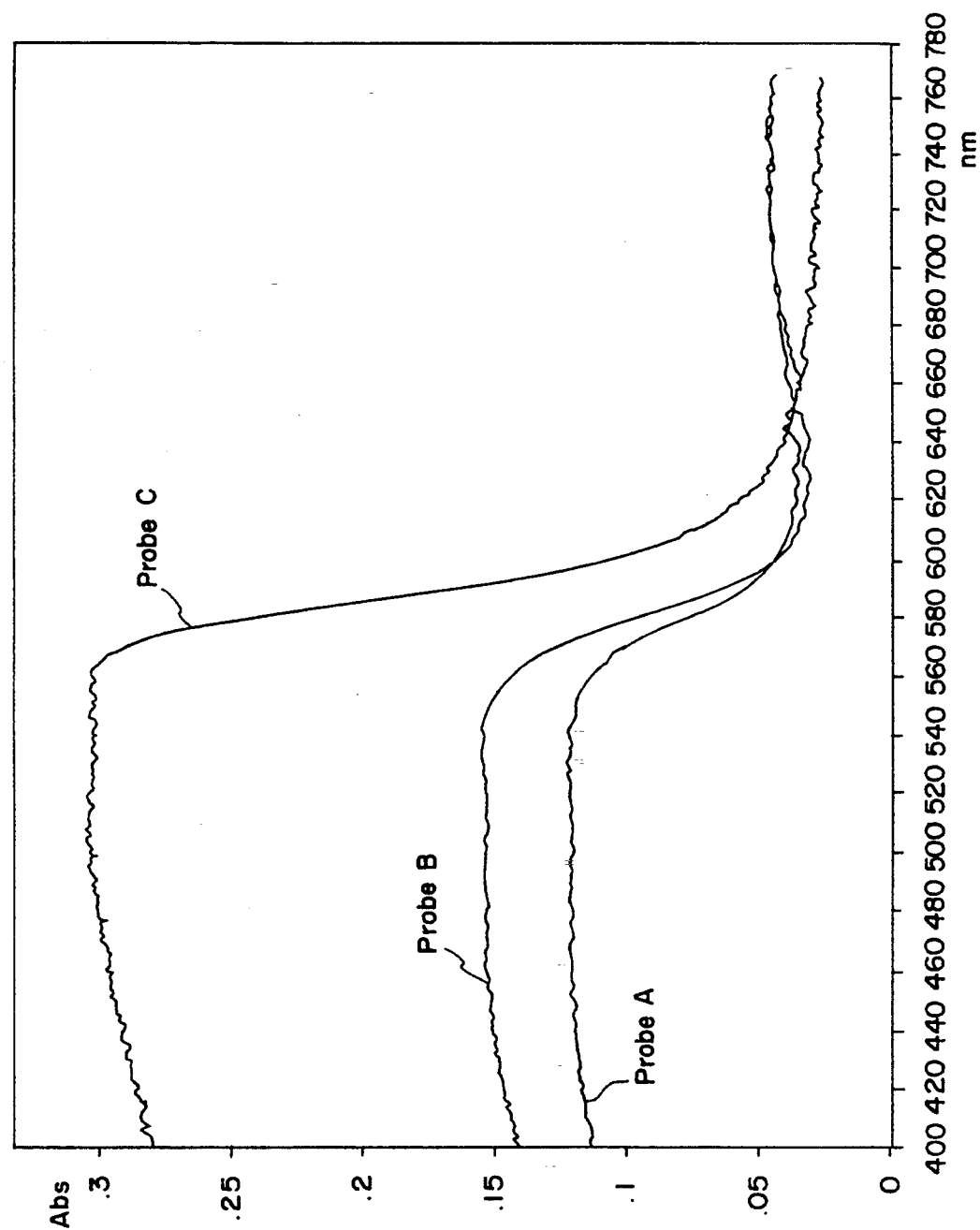
FIG. 1 shows an ultraviolet to visible (UV-VIS) spectrum for three tantalum (V) nitride specimens.
Figure 2:
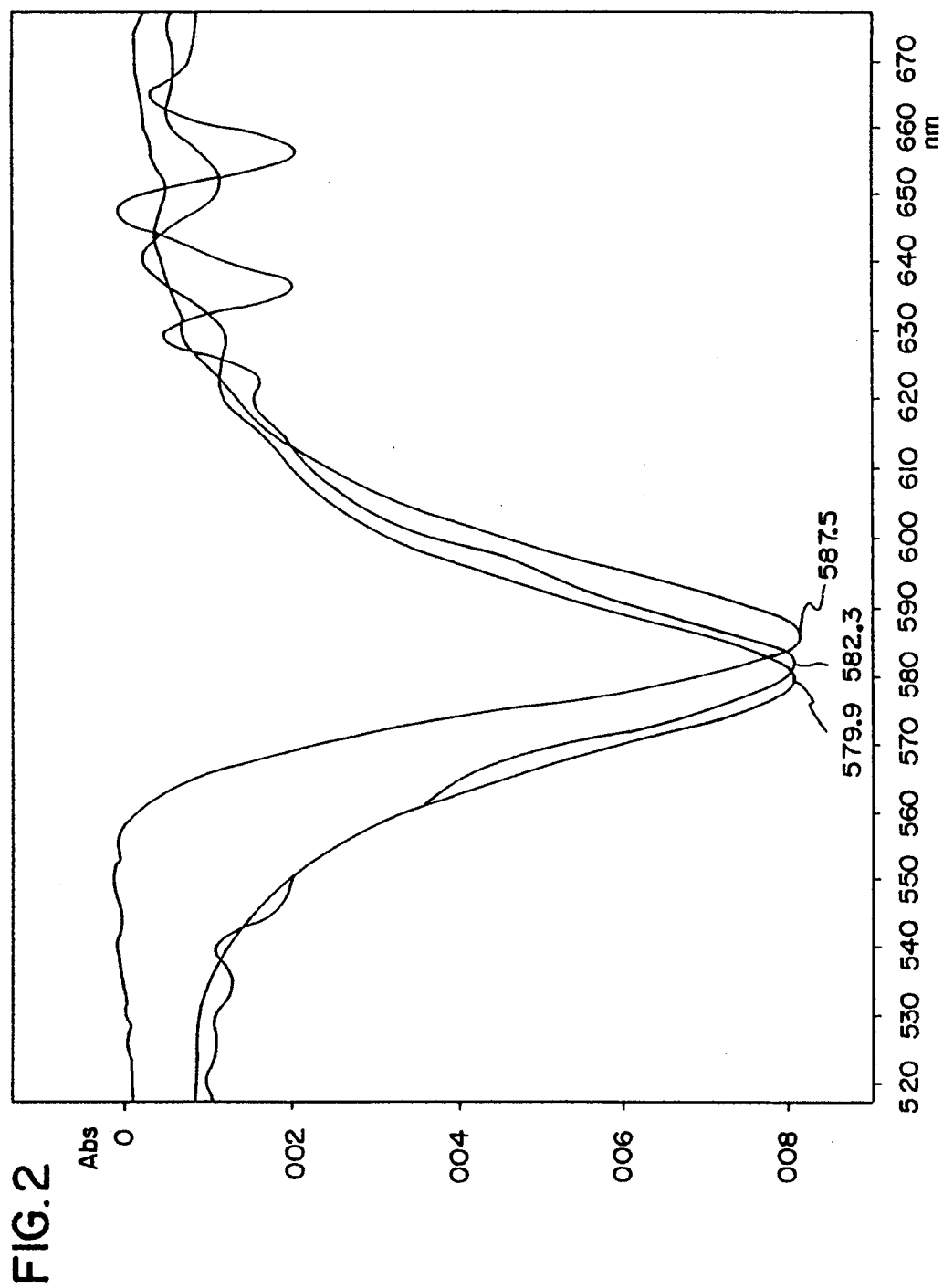
FIG. 2 shows the first derivation of the absorption spectra of FIG. 1.
Figure 3:
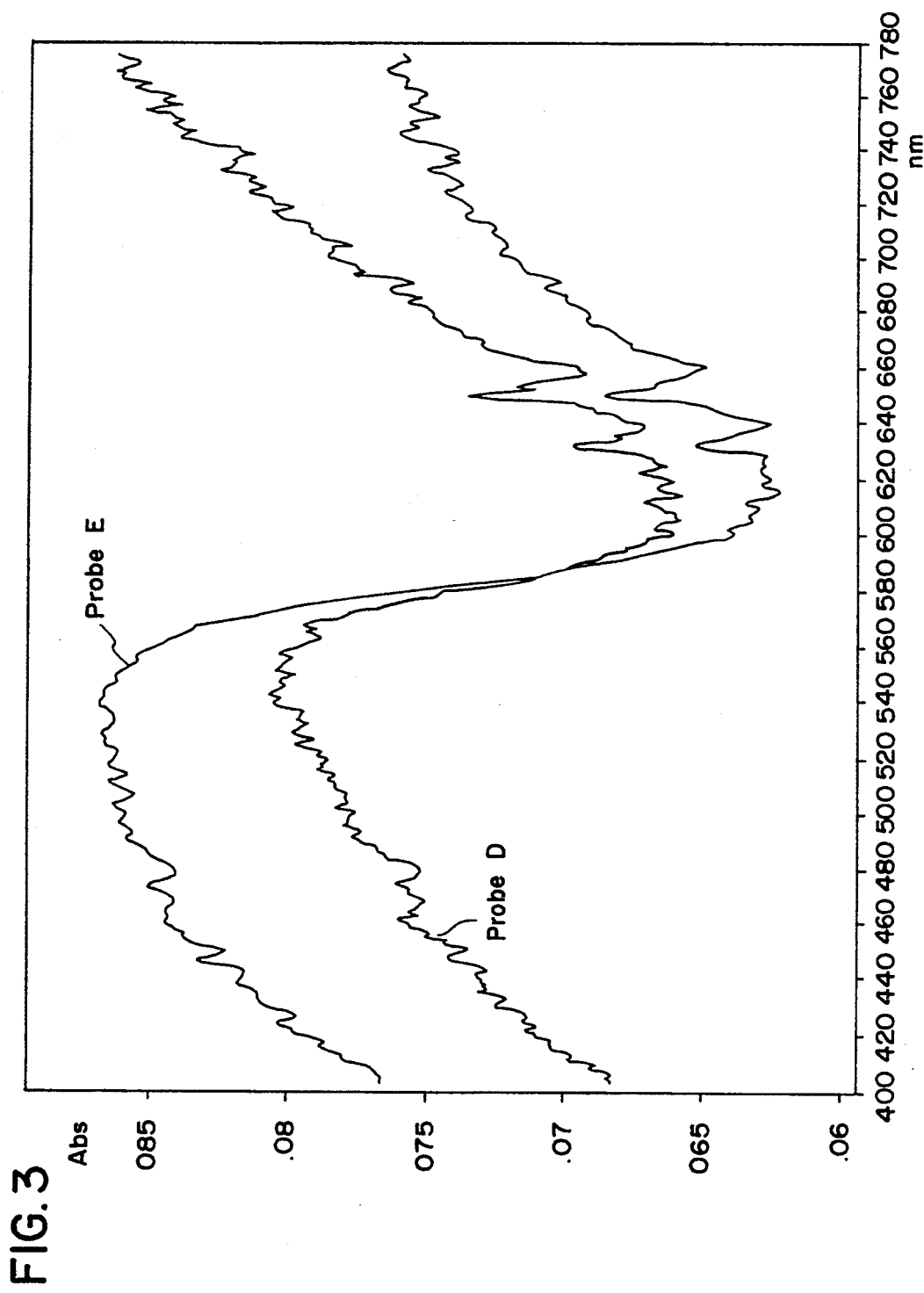
FIG. 3 shows a UV-VIS spectra of tantalum (V) nitride produced in accordance with the process of Brauer and Weidlein.

The effect of the method in accordance with the invention, namely, a considerably greater color intensity after a given reaction time and, in addition, a desired red shift, is clear from the comparative UV-VIS spectra (ultraviolet-visible, FIGS. 1, 2 and 3).

FIG. 1 shows the UV-VIS spectrum of three $Ta_3N_5$ specimens; Specimens A and B were produced according to the previously known method of the state of the art from $Ta_2O_5$ at 820° C. and a reaction time of 80 and 120 hours. On the other hand, Specimen C was produced in accordance with the invention from $Ta_2O_5 \cdot aq$ at 820° C. and 80 hours reaction time. The abscissa shows the wavelength in nanometers and the ordinate shows the coefficient of absorption. The same amount of specimen was measured in each instance (60 mg per 4500 mg $BaSO_4$) in comparison to the standard $BaSO_4$. The measurement took place in the reflection position (Ulbricht sphere). Specimen C, made in accordance with the invention, proved to be considerably more color-intensive. A lengthening of the reaction time from 80 hours (as in specimen A) to 120 hours (as in specimen B) produced a slight increase in the color intensity in the case of the previously known method, but even then the color intensity is still far from that of Specimen C, produced in accordance with the invention.

FIG. 2 shows the first derivation of the absorption spectra of FIG. 1. This figure clearly illustrates the exact position of the absorption edge. The absorption edge of Specimen C, produced in accordance with the invention, is at approximately 588 nm. Therefore, the absorption edge shifted toward the red in comparison to Specimen A (580 nm) and Specimen B (582 nm).

FIG. 3 shows the UV-VIS spectra of tantalum (V) nitride, produced according to the formula of Brauer and Weidlein (Angew. Chem. 77, 218 (1965) and Z. Anorg. Allg. Chem. 348, 298 (1966)) with Ti shavings as an $O_2$ getter, at 900° C. in a 36 hour reaction time (Specimen D) and a 60 hour reaction time. (Specimen E). As evident from a comparison of FIGS. 1 and 3, the color intensity of Specimens D and E is considerably lower than that of Specimen C produced in accordance with the invention. Furthermore, the absorption maximum of Specimens D and E does not reach that of Specimens A and B. The measuring parameters were the same for all of Specimens A to E so that the curves are directly comparable to each other.

The nitridation can be carried out in a furnace at 750° to 950° C., preferably 800° to 870° C., by passing a dry current of ammonia over the tantalum compound to be nitrided. If the batch amount is enlarged by elevating the layer thickness, an extension of the reaction time is generally necessary in order to achieve a color intensity obtainable with a smaller batch amount. This disadvantageous effect can be eliminated by carrying out the nitridation in the presence of a fluxing agent selected from the group of: ammonium salts, carbonic acids of the lower monovalent carbonic acids and polyvalent carbonic acids.

A further alternative for shortening the reaction time is to carry out the nitridation in the presence of a fluxing agent selected from the group of: boric acids, boric acid anhydride and ammonium salts of boric acids.

Among the ammonium salts of carbon-containing acids, ammonium carbonate, ammonium hydrogen carbonate, ammonium formate, ammonium acetate and ammonium oxalate are preferred, with ammonium carbonate being especially preferred. It is believed that the ammonium salt contained in an intensively homogenized powder mixture of tantalum (V) hydrated oxide and fluxing agent, obtainable e.g., by means of a common grinding in a ball mill, brings about a first nitridation. This is surprising particularly in the case of ammonium carbonate, since the later already begins to sublimate after 58° C. However, applicants do not wish to be bound to any particular theory of operation.

Whereas 80 hours are required under comparable conditions of temperature and $NH_3$ gassing for a complete nitridation of 1 gram tantalum (V) hydrated oxide ($Ta_2O_5 \cdot aq$), the reaction time must be lengthened by at least 50% in the absence of a fluxing agent in the case of 20 g $Ta_2O_5 \cdot aq$ (greater feed amount) in order to exclude the formation of color. The reaction time can be shortened back to the original value or if necessary, by nitriding in the presence of a fluxing agent from the group of the ammonium salts of carbon-containing acids, without a change of the color values occurring. This unexpected advantage is significant for providing an industrial use of the method, that is, for production of $Ta_3N_5$ on a large scale.

The use of a fluxing agent from the series of boron compounds has the effect of shortening the reaction time to a greater extent than that of the previously described fluxing agents. In addition to boric acid anhydride, which is preferred, metaboric acid, orthoboric acid or tetraboric acid or ammonium salts of these acids can be used.

The intensively homogenized powder mixture of $Ta_2O_5 \cdot aq$ and fluxing agent to be supplied to the nitridation can also be produced, aside from the customary mixing and grinding methods, by spraying the $Ta_2O_5 \cdot aq$ with an aqueous solution or suspension of one or more of the fluxing agents.

The amount of the fluxing agent can be selected within broad ranges and is a function of the desired shortening of the reaction time. The weight ratio of $Ta_2O_5 \cdot aq$ to fluxing agent is customarily in a range of 1 to 0.01 and 1 to 2. A weight ratio in the range between 1 to 0.1 and 1 to 1 is preferred.

To the extent that the fluxing agents or components thereof remain unreacted during the nitridation in the tantalum (V) nitride, it is advantageous to wash them out after the nitridation. In the case of boron compounds, this washing preferably takes place by means of aqueous lyes, e.g. sodium hydroxide solution.

In the presence of a large amount (e.g., $Ta_2O_5 \cdot aq : B_2O_3 = 1 : 1$) of a boron-containing fluxing agent, the reaction time can be lowered to approximately one fifth of the reaction time without the fluxing agent. However, $Ta_3N_5$ produced in this manner displays a somewhat lesser brilliance than tantalum (V) nitride produced in the absence of a fluxing agent or in the presence of only a slight amount of a boron-containing fluxing agent.

Some of the advantages of the method of the invention are the production of a material with a greater color intensity, the red shift of the pigment, the shortening of the reaction time and the reliable reproducibility on an industrial scale.

As has mentioned above, the tantalum (V) nitride obtainable in accordance with the method of the invention can be used as color pigment. The pigment may be used, for example, in coloring plastics and varnishes, or in printing colors and inks. The pigment may be incorporated into these various materials by conventional techniques known to those skilled in the art. Tantalum (V) nitride is largely thermally stable. Because of this, the material may be used as a coloring for plastics in a mass with subsequent extrusion at temperatures of 200° to 300° C. without causing problems. Even storing varnishes can be colored with the pigment in view of the thermal stability of the pigment; See Example 4, infra.

The use of tantalum (V) nitride as a coloring pigment had the prejudice in the past that the production of this material could not be readily reproduced. In the course of making this material, very varied colors were produced in intermediate stages. This prejudice was eliminated by the method in accordance with the invention. The pallet of red pigments which are temperature-stable up to 300° C. for use in plastics and varnishes which experience a thermal treatment was expanded by this invention.

The following examples relate to the production and use of tantalum (V) nitride.

REFERENCE EXAMPLES A AND B

Production of $Ta_3N_5$

Commercially available tantalum pentoxide (>99.9% $Ta_2O_5$) is ground for 30 minutes in a ball mill. I gram $Ta_2O_5$ is placed in a corundum boat (1=70 mm, b=9 mm) and heated in a current of ammonia (9 l/h over KOH towers) for 80 hours (Reference Example A) and 120 hours (Reference Example B) to 820° C.

FIG. 1 shows the UV-VIS absorption spectra. Curve A corresponds to Reference Example A and curve B corresponds to Reference Example B. The maximum absorption of A and B is considerably less than that of curve C (Example 1 in accordance with the invention, infra). It can be seen from FIG. 2 (which illustrates the first derivation of the curves of FIG. 1) that the absorption edge of the pigment of the invention (shown in curve C) is located further in the red than that of the products produced in accordance with Reference Examples A and B (curves A and B, respectively).

REFERENCE EXAMPLES D AND E $Ta_3N_5$ was prepared according to the formula of Brauer and Weidlein in Angew. Chem. 77, 218 (1965) and Z. Anorg. Allg. Chem 348, 298 (1966) with Ti shavings as an $O_2$ getter from $Ta_2O_5$.

1.5 grams of $Ta_2O_5$ was first ground for 30 minutes in a ball mill then treated in a corundum boat for 36 hours (Reference Example D) and 60 hours (Reference Example E) at 900° C. in a current of $NH_3$ (4 l/h). A boat with Ti shavings stood directly in front of the specimen.

Curves D and E in FIG. 3 show the absorption curve. The maximum absorption for Reference Examples D and E are much lower than that of Example C in FIG. 1. The measuring conditions were the same in all instances:

| Measuring parameters (for FIG. 1 and Reference Examples D, E): | |
| --- | --- |
| Device: | Cary 2400 UV-VIS spectrophotometer available from Varian, Darmstadt |
| Measuring range: | 400 to 780 nm |
| Base lines: | Corrected measurements |
| Weighed portion: | 60 mg specimen on 4.5 g $BaSO_4$ |
| Ordinate: | Absorption |
| Abscissa: | Wavelength in nm |
| Scan Rate: | 1 mm sec$^{-1}$ |
| Measuring interval: | 0.5 nm |

Example 1 a) Production of $Ta_2O_5 \cdot aq$ 2.5 grams tantalum (V) chloride are dissolved in 100 ml concentrated hydrochloric acid in a boiling heat. The mixture is then diluted with 20 ml water, and $Ta_2O_5 \cdot aq$ is precipitated with concentrated ammonia solution at pH=7. A rather long boiling of the precipitate makes possible a smooth filtering off. The precipitate is subsequently washed chloride-free with water, suspended with ethanol and dried at 120° C. until weight constancy. The X-ray amorphous $Ta_2O_5 \cdot aq$ exhibited a residual water content of 16.2% by weight, determined by annealing up to 1000° C.

b) Preparation of $Ta_3N_5$ from $Ta_2O_5 \cdot aq$.

In the same way as is described in Reference Example A, 1 gram $Ta_2O_5 \cdot aq$ was heated for 80 hours at 820° C. in a $NH_3$ stream (9 1/hr). Curve C in FIG. 1 and FIG. 2 show the higher absorption and the shift of the absorption curve in the red direction.

Example 2 a) Test 1b was repeated, but 4 grams $Ta_2O_5 \cdot aq$ were used in the same furnace and boat. 120 hours were necessary at 820° C. and 9 1 $NH_3/h$ until the same color intensity as in Example 1b was reached (equivalent to curve C in FIG. 1).

b) 4 grams $Ta_2O_5 \cdot aq$ were mixed with 0.7 grams $(NH_4)_2CO_3$ and ground for 30 minutes in a ball mill. The nitridation took place as in Example 2a; however, the color formation was concluded after 80 hours. Thus, the co-usage of a fluxing agent can considerably reduce the reaction time.

Example 3 a) Freshly (according to Example 1a) ground tantalum oxide ($Ta_2O_5 \cdot aq$, 0.5 grams, 30 minutes in a ball mill) is mixed with boron trioxide (0.5 g) as a fluxing agent in an agate mortar and reacted for 5 hours in a current of ammonia (9 1/h) at 820° C. The fluxing agent is subsequently removed with 10% potassium hydroxide solution in a boiling heat. The brilliance of the pigment obtained is somewhat less than that of the pigment of Example 1b.

Example 4 a) Tantalum (V) nitride produced according to Example 2b was worked in full tone and also in a bleach test into PVC plastisol and coloristically tested. 1 gram $Ta_3N_5$ was mixed with 3 grams plastisol and dispersed in a color fastness machine. For the bleach test, 0.1 gram $Ta_3N_5$ was compounded with 1 gram $TiO_2$ and processed further with 3 grams plastisol and dispersed in a color fastness machine. Smears with a thickness of 0.5 mm were produced with a carrier from the pastes, the gelling of which smears took place by means of a 10-minute heating to 140° C. The color values a and b in the CIE Lab system (DIN 5033) were measured with a spectral photometer as follows:

|   | Full tone | Bleach test |
|---|-----------|-------------|
| a | +40.5     | +15         |
| b | +31       | +18         | b) A 10-minute thermal treatment of the $Ta_3N_5$ used in Example 4a at 300° C. and a testing of the obtained pigment in the same manner as previously described results in the following a and b values of the colored PVC plastisol (CIE Lab System) as follows:

|   | Full tone | Bleach test |
|---|-----------|-------------|
| a | +43       | +16.5       |
| b | +33       | +19         |

The $Ta_3N_5$ pigment produced in accordance with the invention, as shown by a comparison of Example 4a and 4b, is sufficiently temperature-stable to resist the temperature treatment customary in plastics processing without appreciable color change.

While the invention has been described in terms of various specific examples, those skilled in the art will recognize that various modifications can be made without departing from the spirit and scope of the invention, as defined in the appended claims.

The priority application, German Patent Application No. P 42 34 938.9, filed in Germany on Oct. 16, 1992, is relied on and entirely incorporated herein by reference.

We claim:

1. A method of producing tantalum (V) nitride comprising: nitriding an oxidic tantalum (V) compound with dry ammonia at 750° C. to 950° C., wherein the oxidic tantalum (V) compound is a tantalum (V) hydrated oxide having a composition of the formula $Ta_2O_5 \cdot aq$, with a hydrate content in a range of 14 to 17 % by weight.

2. The method according to claim 1, wherein the nitriding is carried out at 800° to 870° C.

3. A method of producing tantalum (V) nitride, comprising: nitriding an oxidic tantalum (V) compound with dry ammonia at 750° C. to 950° C., wherein the oxidic tantalum (V) compound is a tantalum (V) hydrated oxide having a composition according to the formula: $Ta_2O_5 \cdot aq$, with a hydrate content in the range. of 14 to 17 % by weight, wherein the nitriding is carried out in the presence of a fluxing agent selected from the group consisting of: ammonium salts, carbonic acid, lower monovalent carbonic acids, and polyvalent carbonic acids.

4. A method of producing tantalum (V) nitride, comprising: nitriding an oxidic tantalum (V) compound with dry ammonia at 750° C. to 950° C., wherein the oxidic tantalum (V) compound is a tantalum (V) hydrated oxide having a composition according to the formula: $Ta_2O_5 \cdot aq$, with a hydrate content in the range of 14 to 17 by weight, wherein the nitriding is carried out in the presence of a fluxing agent selected from the group consisting of: boric acids, boric acid anhydride and ammonium salts of boric acids.

5. The method according to claim 3, wherein the tantalum (V) hydrated oxide and fluxing agent are used in a weight ratio in the range of 1:0.01 to 1:2.

6. The method according to claim 5, wherein the weight ratio is in the range of 1:0.1 to 1:1.

7. The method according to claim 4, wherein the tantalum (V) hydrated oxide and fluxing agent are used in a weight ratio in the range of 1:0.01 to 1:2.

8. The method according to claim 7, wherein the weight ratio is in the range of 1:0.1 to 1:1.

9. The method according to claim 3, wherein an Intensively homogenized powder mixture of tantalum (V) hydrated oxide and fluxing agent is nitrided.

10. The method according to claim 4, wherein an intensively homogenized powder mixture of tantalum (V) hydrated oxide and fluxing agent is nitrided.

11. The method according to claim 5, wherein an intensively homogenized powder mixture of tantalum (V) hydrated oxide and fluxing agent is nitrided.

12. The method according to claim 6, wherein an intensively homogenized powder mixture of tantalum (V) hydrated oxide and fluxing agent is nitrided.

13. The method according to claim 7, wherein an intensively homogenized powder mixture of tantalum (V) hydrated oxide and fluxing agent is nitrided.

14. The method according to claim 8, wherein an intensively homogenized powder mixture of tantalum (V) hydrated oxide and fluxing agent is nitrided.

* * * * *